United States Patent [19]
Dumser

[11] Patent Number: 6,089,263
[45] Date of Patent: Jul. 18, 2000

[54] DISTRIBUTION DEVICE FOR A LIQUID MEDIUM-OPERATED CIRCUIT OF A HEATING OR COOLING SYSTEM

[75] Inventor: Josef Dumser, Landau/Pfalz, Germany

[73] Assignee: Dumser Metallbau GmbH & Co., KG, Landau/Pfalz, Germany

[21] Appl. No.: 09/150,795

[22] Filed: Sep. 10, 1998

[30] Foreign Application Priority Data

Sep. 18, 1997 [DE] Germany ............... 297 16 779

[51] Int. Cl.$^7$ ............................................. E03B 7/07
[52] U.S. Cl. ..................... 137/552; 137/883; 137/887; 137/563
[58] Field of Search ............................. 137/552, 883, 137/887, 606, 563

[56] References Cited

U.S. PATENT DOCUMENTS

| 3,804,118 | 4/1974 | Love et al. ............... 137/883 |
| 5,303,733 | 4/1994 | Nelson ...................... 137/883 |
| 5,311,895 | 5/1994 | Martin ....................... 137/883 |

FOREIGN PATENT DOCUMENTS

| 8903159 | 5/1990 | Germany . |
| 4325737 | 2/1995 | Germany . |

*Primary Examiner*—A. Michael Chambers
*Attorney, Agent, or Firm*—Friedrich Kueffner

[57] ABSTRACT

A distribution device for a circuit operated with a liquid medium for a heating system or a cooling system, such as a hot water heating plant, a solar plant or the like. The distribution device serves to separate the medium into individual circuits each having a distribution pipe for forward and return flow, wherein the distribution pipes are provided with regulating and locking members as well as, if necessary, measuring and indicating members for the individual circuits. The regulating and locking members include members for preadjusting the maximum flow rate and for regulating the respective circuit, wherein the regulating and locking members are each combined in a fitting with only one valve body with flow from the front against the valve body, and wherein the regulating and locking members are exclusively arranged in the return flow pipe.

5 Claims, 3 Drawing Sheets

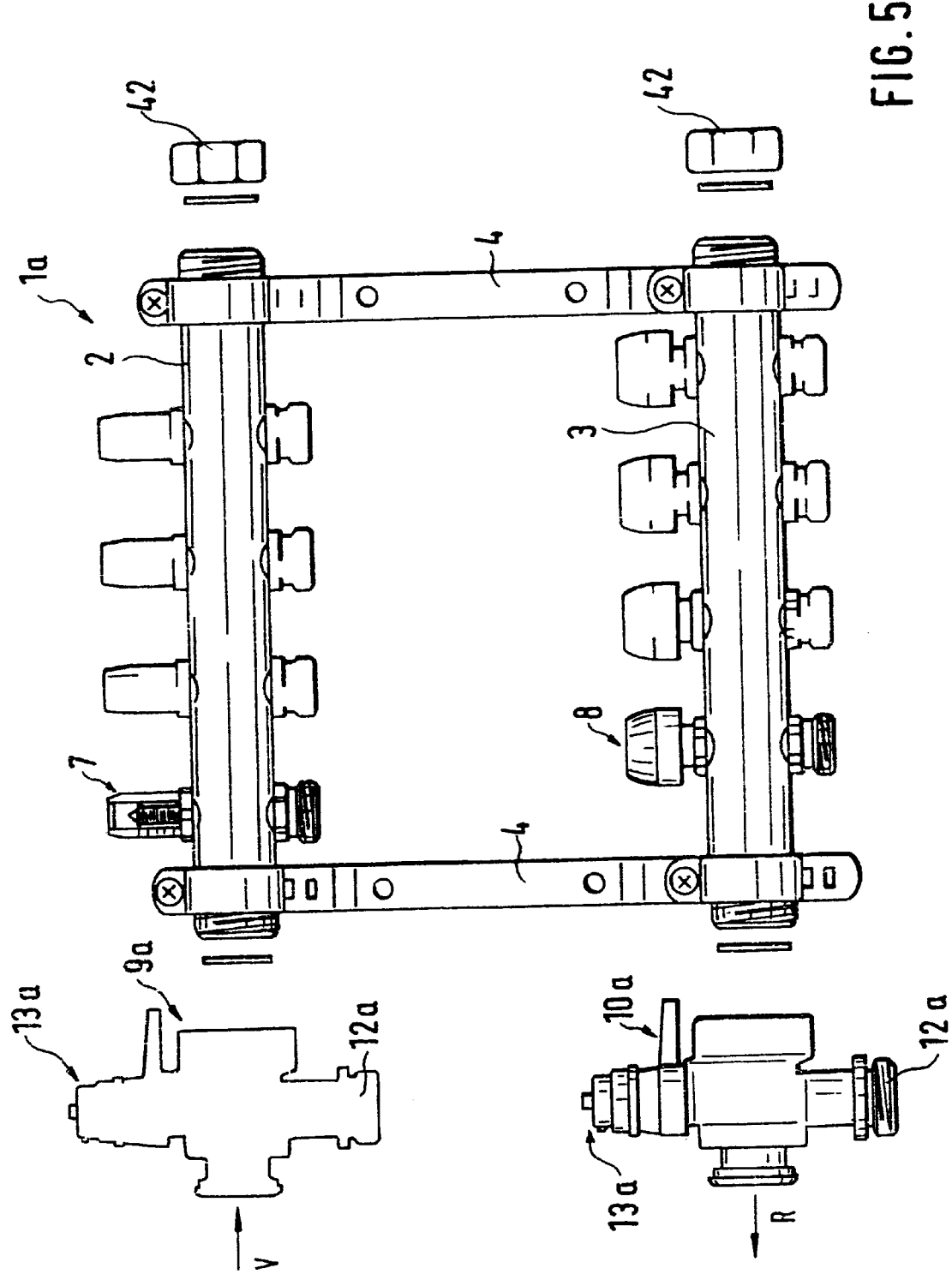

DISTRIBUTION DEVICE FOR A LIQUID MEDIUM-OPERATED CIRCUIT OF A HEATING OR COOLING SYSTEM

BACKGROUND OF THE INVENTION

1. Field of the Invention

The present invention relates to a distribution device for a circuit operated with a liquid medium for a heating system or a cooling system, such as a hot water heating plant, a solar plant or the like. The distribution device serves to separate the medium into individual circuits each having a distribution pipe for forward and return flow, wherein the distribution pipes are provided with regulating and locking members as well as, if necessary, measuring and indicating members for the individual circuits.

2. Description of the Related Art

Distribution devices of the above-described type serve as so-called circuit distributors for distributing in an adjustable and regulating manner the heating medium circulating in a heating system to local individual heating locations. This type of device is required especially in the case of floor heating systems. A floor heating system is comprised of several individual heating circuits which are branched off from the main heating system by a plurality of adjusting and regulating members. These adjusting and regulating members require a large amount of space and must be accommodated in such a way that they are accessible for operating and maintaining them.

In order to save space, it is already known in the art to use as distribution devices pipe sections which are each connected through locking members to the forward flow pipe or the return flow pipe. In these pipe sections, pairs of openings are provided in the pipe wall, wherein the openings are offset relative to each other by 180° at opposite locations. An actuating member is mounted in one of the openings, wherein this actuating member acts directly on a valve which is mounted in the other opening (DE 89 03 159 U1).

In particular in floor heating systems, it is necessary that the circuits for individual rooms can be regulated independently from each other. Since the heating circuits are of different size depending on the area of each room, in addition to the conventional regulating valves which are operated manually by means of an electric adjusting drive or through a thermostat, so-called flow rate limiting devices must be arranged for adjusting the maximum flow rates for each circuit.

Since in regulating valves the flow must always be against the valve body, these valves can only be used in the return flow in the case of heating circuit distributors. Flow rate limiting devices are mounted in the forward flow. This means that fittings which serve to regulate the flow must be mounted in the forward flow as well as in the return flow in these known heating circuit distributors.

The measuring and indicating members, such as flow rate indicators and temperature measuring devices, are independent of the regulating and locking members. In order to be able to mount the measuring and indicating members simultaneously, the heating circulating distributor described above provides for mounting the flow rate and temperature measuring units to be mounted in the return flow of the individual circuits and to combine them with the members for regulating the heating circuit, while arranged only in the forward flow are the members for preadjusting the maximum flow rate.

Particularly when compact radiators are used, it is also known in the art to combine a regulating valve with a flow rate limiting device in one structural unit (DE 43 25 737 C2). In this regulating valve which is arranged in the forward flow, i.e., the flow is from the front against this valve, the flow rate limiting device has in an outer pipe portion a flow opening and in an inner, also tubular, portion a number of openings with different diameters which can be placed in alignment with the flow opening in the outer pipe portion by rotating the inner pipe portion. In this manner, a socket wrench can be used for adjusting from the outside several predetermined flow rates. This corresponds to the use of compact radiators having certain sizes.

SUMMARY OF THE INVENTION

In view of the prior art discussed above, it is the primary object of the present invention to provide a possibility for achieving a simpler more easily assembled and operated and especially more economical type of construction in a distribution device of this type, particularly a heating circuit distributor.

In accordance with the present invention, the regulating and locking members include members for preadjusting the maximum flow rate and for regulating the respective circuit, wherein the regulating and locking members are each combined in a fitting with only one valve body with flow from the front against the valve body, and wherein the regulating and locking members are exclusively arranged in the return flow pipe.

Accordingly, in accordance with the present invention, all regulating and locking members, i.e., flow rate limiting devices and regulating valves, are each combined in a fitting in the return flow pipe in which the flow against the valve body is from the front of the valve body to provide an advantageous flow behavior, while measuring and indicating members, if they are to be provided at all, are arranged in the forward flow pipe. The type of construction of each individual member is of no significance.

The greatest advantage with respect to operation is achieved if, in the heating circuit distributor according to the present invention in which, as is usual, forward and return flow pipes are arranged parallel to each other and extending horizontally, the return flow pipe is arranged in a lower plane and the forward flow pipe is arranged in an upper plane. This makes it possible in a simple manner to adjust in the individual heating circuits in the lower plane the maximum flow rate which can be easily and clearly controlled by means of the flow rate indicator arranged in the upper plane. After the preadjustment of the maximum flow rates by means of appropriate tools, a knob for manual adjustment or an electric adjusting drive can be placed on each valve in the conventional manner. By arranging the flow rate indicator in the upper forward flow pipe, there remains above the heating circuit distributor sufficient space for accommodating the electrical regulating and control members including the electric installations required for these members.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

BRIEF DESCRIPTION OF THE DRAWING

In the drawing:

FIG. 5 is a schematic elevational view of another embodiment of a heating circuit distributor.

DESCRIPTION OF THE PREFERRED EMBODIMENTS

Figure 2:
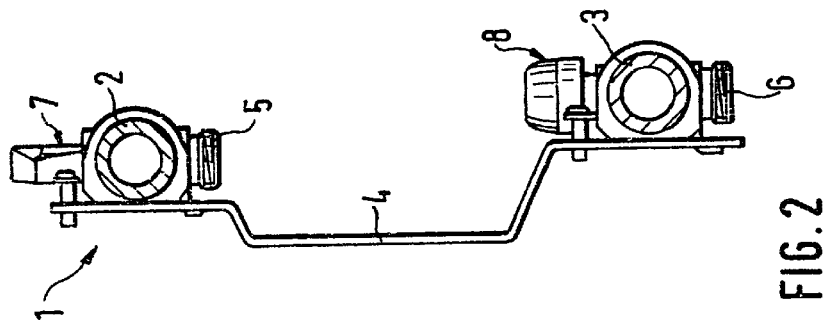
FIG. 2 is a cross-sectional view of the heating circuit distributor of FIG. 1.
Figure 1:
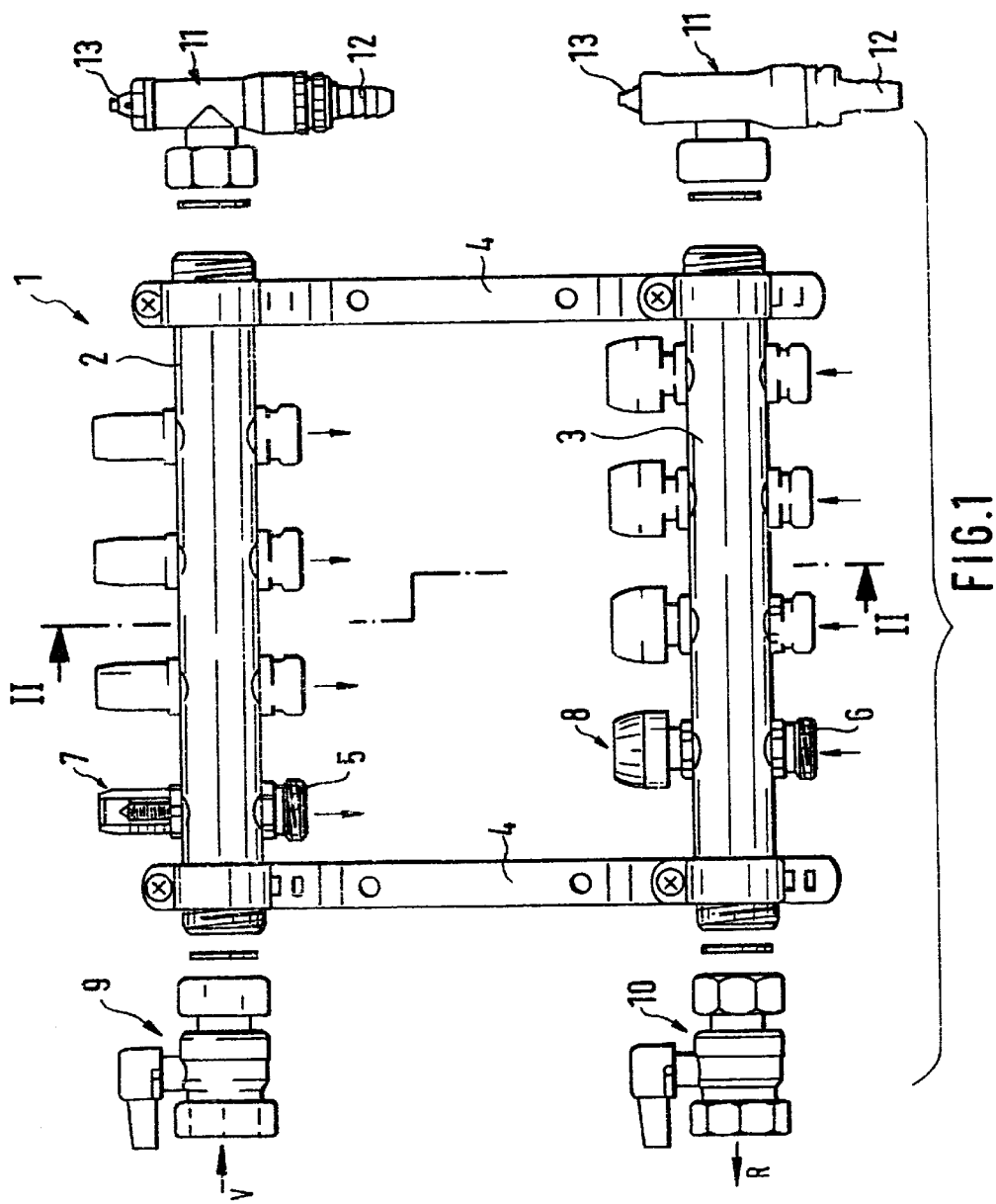
FIG. 1 is a schematic elevational view of a heating circuit distributor.

The heating circuit distributor 1 shown in a side view in FIG. 1 and in a cross-sectional view in FIG. 2 includes an upper forward flow pipe 2 and a lower return flow pipe 3. The forward flow pipe 2 and the return flow pipe 3 are combined and held at a distance from each other by means of brackets 4, wherein the pipes can also be attached to a wall by means of the brackets 4. Forward flow and return flow are indicated by arrows V and R, respectively.

Provided on the forward and return flow pipes 2 and 3 are branches 5 for the forward flow and branches 6 for the return flow of the individual heating circuits, wherein indicating members 7 are provided at the branches 5 of the forward flow pipe 2 and regulating members 8 are provided at the branches 6 of the return flow pipe 3. An embodiment of an indicating members 7 is shown in FIG. 3 and an embodiment of a regulating member 8 is shown in FIG. 4.

Additionally provided in the heating circuit distributor 1 on the boiler side is a locking member 9, for example, in the form of a ball valve, in the forward flow pipe 2 and another corresponding locking member 10 in the return flow pipe 3. Provided on the opposite side in a distributor end piece 11 are the conventional members for filling or emptying 12 and for aerating 13.

Figure 3:
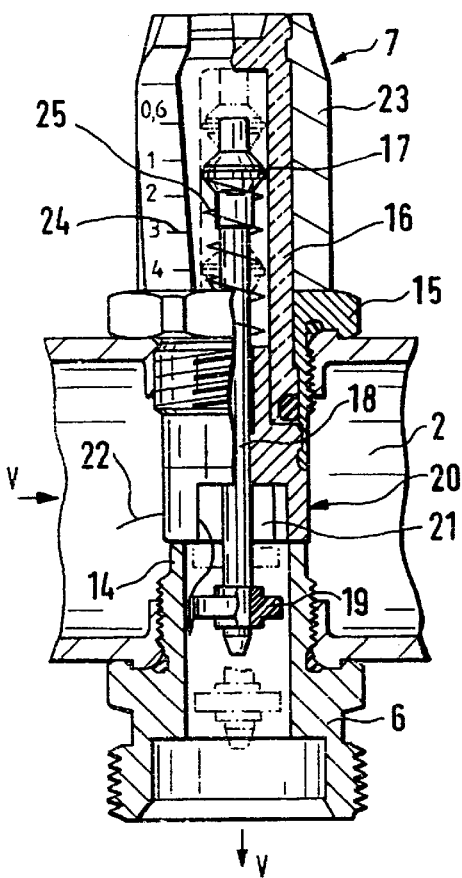
FIG. 3 is a partially sectional view, on a larger scale, showing an embodiment of a flow rate indicator to be used in accordance with the present invention.
Figure 4:
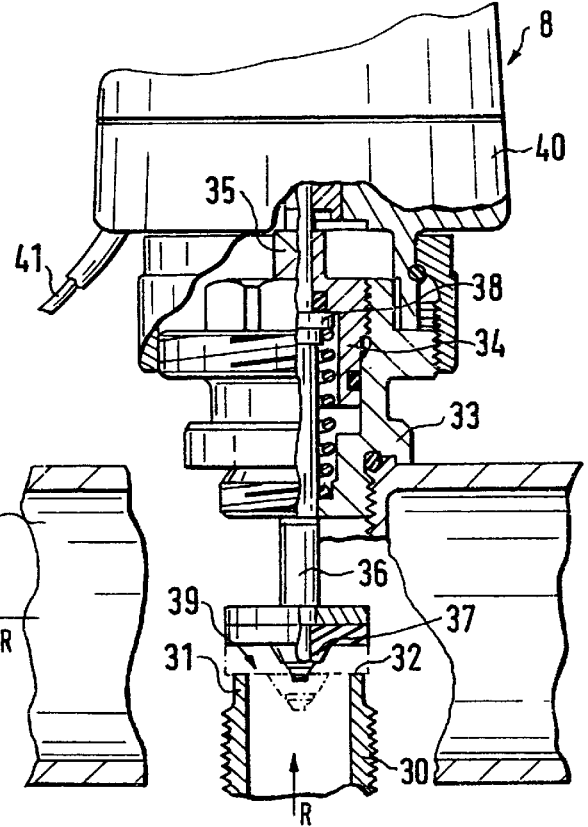
FIG. 4 is a partially sectional view of an embodiment of a regulating valve with flow rate limiting device to be used in accordance with the present invention.

FIG. 3 shows, partially in section, a measuring and indicating member for the flow rate to be used within the distributor according to the present invention. The indicating member is denoted by reference numeral 7. The indicating member 7, as shown in FIG. 1, is mounted in the forward flow pipe 2. The branch 5 is screwed with a pipe piece 14 into the forward flow pipe 2.

Opposite the screwed-in part of the branch 5 and the pipe piece 14 is located an also screwed-in guide piece 15 for an observation glass 16 of transparent material. An indicator 17 can be seen in the glass 16, wherein the indicator 17 is in connection through an indicator rod 18 with a baffle plate 19. The forward flow flows against the baffle plate 19 in the pipe piece 14. A flow guide sleeve 20 connects the pipe piece 14 in a sealing manner to the guide piece 15 or the observation glass 16. The sleeve 20 has lateral openings 21 through which, as indicated by arrow 22, the medium forming the forward flow can enter in the sleeve 20 and can leave the forward flow pipe 2 through the branch 5.

The observation glass 16 is surrounded by a scale carrier 23 which, adjacent to a viewing opening, has a scale 24 which interacts with the indicator 17. The medium flowing against the baffle plate 17 moves the baffle plate 17 downwardly against a compression spring element 25, so that, depending on the flow rate, the location of the indicator 17 can be read at the scale.

A regulating member to be used in accordance with the present invention is shown in FIG. 4 on a larger scale.

This regulating member, indicated by reference numeral 8, is provided in the return flow pipe 3. Similar to the indicating member 7, a screwed-in piece 30 protrudes with a pipe piece 31 into the interior of the return flow pipe 3. The upper end of the pipe piece 31 forms a valve seat 32.

A guide piece 33 is mounted from the top in the return flow pipe 3. In insert piece 34 is screwed into the guide piece 33. The insert piece 34 has at the top thereof a square portion 35 for actuation by means of a tool. A valve rod 36 extends through the guide piece 33 as well as through the insert piece 34. At its lower end, the valve rod 36 has a valve cone 37 and at its upper end the valve rod 36 has a stop collar 38 which makes contact with a shoulder in the insert piece 34. Consequently, by screwing in the insert piece 34, the maximum travel height of the valve cone 37 and the flow gap 39 can be limited.

In the illustrated embodiment, an electric adjusting drive 40 provided with an electric connection cable 41 is mounted on the regulating member 8. In dependence on a thermostat, this adjusting drive 40 can be used for opening and closing by moving the valve rod 36 and, thus, the valve cone 37 to the adjusted height. The circuit can be regulated in this manner.

As illustrated in FIG. 5, the heating circuit distributor 1a according to the present invention can be further simplified and made more economical by using as locking members 9a, 10a those disclosed in German Utility Model 296 21 038 which include, in addition to the locking function by a ball valve, each a connection 12a for filling and emptying the heating circuit and an automatic aerating device 13a. In that case, simple closing caps 42 are sufficient on the opposite sides of the forward flow pipe 2 and the return flow pipe 3.

While specific embodiments of the invention have been shown and described in detail to illustrate the inventive principles, it will be understood that the invention may be embodied otherwise without departing from such principles.

I claim:

1. A distribution device for a heating or cooling system operated in a circuit of a liquid medium, for distributing the medium into individual circuits, the distribution device comprising a forward flow pipe and a return flow pipe, further comprising regulating and locking members mounted exclusively in the return flow pipe, wherein the regulating and locking members comprise members for pre-adjusting a maximum flow rate of the medium and for regulating a flow of the medium through each circuit so that the forward flow pipe is free of any flow control means, and wherein the members for pre-adjusting the maximum flow rate and for regulating the respective circuit are each arranged in a fitting with only one valve body configured such that the medium flows against a front thereof.

2. The device according to claim 1, further comprising measuring and indicating members mounted in the forward flow pipe.

3. The device according to claim 2, wherein the measuring and indicating members comprise flow rate indicators and temperature measuring devices.

4. The device according to claim 1, wherein the forward flow pipe and the return flow pipe extend horizontally.

5. The device according to claim 4, wherein the forward flow pipe is located in an upper plane and the return flow pipe is located in a lower plane.

* * * * *